United States Patent
Lin et al.

(10) Patent No.: US 10,909,156 B2
(45) Date of Patent: Feb. 2, 2021

(54) SEARCH AND FILTERING OF MESSAGE CONTENT

(71) Applicant: Microsoft Technology Licensing, LLC, Redmond, WA (US)

(72) Inventors: Sherry Pei-Chen Lin, Redmond, WA (US); Linda Chen Gray, Kirkland, WA (US); Thomas Coolidge Stanton, Seattle, WA (US); Andrew James Peacock, Seattle, WA (US); Megan Marie Quintero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/430,270

(22) Filed: Feb. 10, 2017

(65) Prior Publication Data
US 2018/0232441 A1    Aug. 16, 2018

(51) Int. Cl.
*G06F 16/335*    (2019.01)
*H04L 12/58*    (2006.01)
(Continued)

(52) U.S. Cl.
CPC .......... *G06F 16/337* (2019.01); *G06F 16/353* (2019.01); *G06F 16/9535* (2019.01);
(Continued)

(58) Field of Classification Search
CPC ......... G06F 17/30702; G06F 17/30707; G06F 17/30867; G06F 16/337; G06F 16/353;
(Continued)

(56) References Cited

U.S. PATENT DOCUMENTS 6,424,362 B1   7/2002   Bornstein et al.
7,546,352 B1   6/2009   Bhattiprolu et al.
(Continued)

FOREIGN PATENT DOCUMENTS

EP   1777650 A1   4/2007
WO   2009109657 A2   9/2009
(Continued)

OTHER PUBLICATIONS

"International Search Report & Written Opinion Issued in PCT Application No. PCT/US18/016781", dated Apr. 18, 2018, 11 Pages.
(Continued)

*Primary Examiner* — Hosain T Alam
*Assistant Examiner* — Saba Ahmed

(57) ABSTRACT

Non-limiting examples describe enhanced searching and filtering of message content by an application/service. Processing operations described herein are applicable to any type of message content including but not limited to bundled content of an email service. A search input may be received through a user interface of an email service. The search input may be for searching emails associated with a mailbox the email service. Email results may be retrieved based on the received search input. The retrieved email results may be categorized into one or more categories. A smart filter may be generated for filtering the retrieved email results. An exemplary smart filter may comprise at least one filter field that corresponds to category specific content extracted from emails of a category of the one or more categories. The email results and the smart filter may be displayed through the user interface of the email service.

20 Claims, 8 Drawing Sheets

(51) Int. Cl.
*G06N 20/00* (2019.01)
*G06F 16/35* (2019.01)
*G06F 16/9535* (2019.01)
*G06Q 10/10* (2012.01)

(52) U.S. Cl.
CPC .............. *G06N 20/00* (2019.01); *G06Q 10/10* (2013.01); *G06Q 10/107* (2013.01); *H04L 51/12* (2013.01); *H04L 51/16* (2013.01); *H04L 51/22* (2013.01)

(58) Field of Classification Search
CPC .... G06F 16/9535; G06N 20/00; G06Q 10/10; G06Q 10/107; H04L 51/12; H04L 51/16; H04L 51/22
USPC ......................................................... 707/737
See application file for complete search history.

(56) References Cited

U.S. PATENT DOCUMENTS

| | | | |
|---|---|---|---|
| 7,693,940 B2 | 4/2010 | Carmel et al. | |
| 7,707,255 B2 | 4/2010 | Satterfield et al. | |
| 7,831,676 B1* | 11/2010 | Nagar | G06Q 10/107 709/203 |
| 7,885,948 B2* | 2/2011 | Johnson | H04L 47/10 707/705 |
| 7,904,525 B2 | 3/2011 | Eggers et al. | |
| 8,156,123 B2* | 4/2012 | Tribble | G06F 16/90335 707/739 |
| 8,209,617 B2 | 6/2012 | Vanderwende et al. | |
| 8,224,914 B2* | 7/2012 | Thomas | H04L 51/12 709/206 |
| 8,463,827 B2* | 6/2013 | Ramarao | G06Q 10/00 707/750 |
| 8,548,973 B1 | 10/2013 | Kritt et al. | |
| 8,745,045 B2* | 6/2014 | Bawri | G06Q 10/107 707/728 |
| 8,996,530 B2* | 3/2015 | LuVogt | G06Q 10/10 707/740 |
| 9,076,147 B2 | 7/2015 | Khoo et al. | |
| 2005/0091184 A1 | 4/2005 | Seshadri et al. | |
| 2005/0182773 A1 | 8/2005 | Feinsmith | |
| 2006/0206495 A1 | 9/2006 | Van gageldonk et al. | |
| 2007/0226204 A1* | 9/2007 | Feldman | G06F 16/30 |
| 2007/0239755 A1 | 10/2007 | Mahoney | |
| 2007/0266095 A1 | 11/2007 | Billsus et al. | |
| 2008/0086703 A1 | 4/2008 | Flynt et al. | |
| 2008/0281927 A1 | 11/2008 | Vanderwende et al. | |
| 2009/0187548 A1 | 7/2009 | Ji et al. | |
| 2010/0036922 A1* | 2/2010 | Stafford | G06Q 10/107 709/206 |
| 2010/0169320 A1* | 7/2010 | Patnam | H04L 51/34 707/737 |
| 2010/0223261 A1* | 9/2010 | Sarkar | G06F 17/30705 707/726 |
| 2010/0257230 A1 | 10/2010 | Kroeger et al. | |
| 2010/0332428 A1 | 12/2010 | Mchenry et al. | |
| 2011/0004573 A1* | 1/2011 | Chitiveli | G06N 20/00 706/12 |
| 2011/0126126 A1 | 5/2011 | Blair | |
| 2011/0307482 A1 | 12/2011 | Radlinski et al. | |
| 2012/0005284 A1 | 1/2012 | Tse | |
| 2012/0158728 A1 | 6/2012 | Kumar et al. | |
| 2012/0173533 A1 | 7/2012 | Ramarao et al. | |
| 2012/0226681 A1 | 9/2012 | Paparizos et al. | |
| 2013/0024788 A1 | 1/2013 | Olsen et al. | |
| 2013/0055105 A1 | 2/2013 | Spierer | |
| 2013/0166548 A1 | 6/2013 | Puzicha et al. | |
| 2013/0198296 A1 | 8/2013 | Roy et al. | |
| 2013/0241499 A1 | 9/2013 | Johnson et al. | |
| 2014/0006409 A1 | 1/2014 | Prosnitz et al. | |
| 2014/0040770 A1 | 2/2014 | Khoo | |
| 2014/0046945 A1 | 2/2014 | Deolalikar et al. | |
| 2014/0108066 A1 | 4/2014 | Lam et al. | |
| 2014/0143254 A1 | 5/2014 | Datta et al. | |
| 2014/0172821 A1 | 6/2014 | Hu et al. | |
| 2014/0173457 A1 | 6/2014 | Wang et al. | |
| 2014/0289258 A1 | 9/2014 | Joshi et al. | |
| 2014/0310281 A1* | 10/2014 | Somekh | G09B 19/00 707/737 |
| 2014/0372446 A1 | 12/2014 | Bell et al. | |
| 2015/0127754 A1 | 5/2015 | Clark et al. | |
| 2015/0186478 A1 | 7/2015 | Yan et al. | |
| 2015/0186494 A1 | 7/2015 | Gilad et al. | |
| 2015/0234893 A1 | 8/2015 | Kaasten et al. | |
| 2015/0256499 A1* | 9/2015 | Kumar | G06F 16/958 709/206 |
| 2015/0326521 A1 | 11/2015 | Osipkov et al. | |
| 2015/0341300 A1 | 11/2015 | Swain et al. | |
| 2016/0080303 A1 | 3/2016 | Deolalikar et al. | |
| 2016/0173433 A1 | 6/2016 | Bastide et al. | |
| 2016/0182311 A1* | 6/2016 | Borna | G06Q 10/1095 705/7.19 |
| 2016/0241499 A1 | 8/2016 | Hailpern et al. | |
| 2016/0301705 A1 | 10/2016 | Higbee et al. | |
| 2016/0314182 A1 | 10/2016 | Zhang et al. | |
| 2016/0314184 A1 | 10/2016 | Bendersky et al. | |
| 2016/0323223 A1 | 11/2016 | Davis et al. | |
| 2017/0004199 A1 | 1/2017 | Hausler et al. | |
| 2017/0228114 A1* | 8/2017 | Brett | G06F 3/0482 |
| 2018/0006973 A1 | 1/2018 | Hays et al. | |
| 2018/0234374 A1 | 8/2018 | Gray et al. | |
| 2018/0234375 A1 | 8/2018 | Gray et al. | |
| 2018/0234376 A1 | 8/2018 | Gray et al. | |
| 2018/0234377 A1 | 8/2018 | Gray et al. | |
| 2020/0028814 A1 | 1/2020 | Gray et al. | |

FOREIGN PATENT DOCUMENTS

| | | |
|---|---|---|
| WO | 2013113093 A1 | 8/2013 |
| WO | 20160144992 A1 | 9/2016 |
| WO | 2016164844 A1 | 10/2016 |

OTHER PUBLICATIONS

"Non Final Office Action Issued in U.S. Appl. No. 15/430,245", dated Mar. 11, 2019, 11 Pages.

"Final Office Action Issued in U.S. Appl. No. 15/430,290", dated Jan. 31, 2019, 12 Pages.

"Non Final Office Action Issued in U.S. Appl. No. 15/430,327", dated Mar. 8, 2019, 15 Pages.

"Non Final Office Action Issued in U.S. Appl. No. 15/430,245", dated Feb. 19, 2020, 13 Pages.

"Notice of Allowance Issued in U.S. Appl. No. 15/430,327", dated Oct. 24, 2019, 7 Pages.

"Final Office Action Issued in U.S. Appl. No. 15/430,245", dated Aug. 7, 2020, 16 Pages.

"Final Office Action Issued in U.S. Appl. No. 15/430,245", dated Sep. 13, 2019, 13 Pages.

"Non Final Office Action Issued in U.S. Appl. No. 15/430,290", dated Jul. 31, 2019, 11 Pages.

"Group or ungroup messages in your Inbox", Retrieved from https://support.office.com/en-us/article/Group-{}r-ungroup-messages-inour-Inbox-c6d17df3-8488-42b2-a773-278686205478, Dec. 21, 2016, 2 Pages.

"How do I share trip details with others?", Retrieved From: https://www.airbnb.co.in/help/article/1175/how-do-i-share-trip-details-with-others, Dec. 20, 2016, 1 Page.

"How to Create Your Own Bundle in Google Inbox", Retrieved From: http:/www.wikihow.com/Create-Your-Own-Bundle-in-Google-Inbox, Nov. 7, 2014, 2 Pages.

"Team Chat and Collaboration Right From Gmail", Retrieved from: https://web.archive.org/web/20161101015942/gmaillabel.cloudhq.net/, Nov. 1, 2016, 5 Pages.

"Using Tags and Folders to Organize Your Mailbox", Retrieved From: http://docplayer.net/8609804-Zimbra-web-client-user-guide.html, Dec. 27, 2016, 22 Pages.

(56) References Cited

OTHER PUBLICATIONS

Aaron, "Clean up your inbox with bundles", Retrieved From: https://support.google.com/inbox/answer/6050237?hl=en&ref_topic=6067574, Dec. 20, 2016, 2 Pages.

Aaron, "Label emails in Inbox", Retrieved From: https://support.google.com/inbox/answer/6067566?hl=en, Dec. 20, 2016, 2 Pages.

Aaron, "Organize travel plans into Trip bundles", Retrieved From: https://support.google.com/inbox/answer/6228360?hl=en, Dec. 27, 2016, 3 Pages.

Ayodele, et al., "Email Grouping and Summarization: An Unsupervised Learning Technique", In Proceedings of World Congress on Computer Science and Information Engineering vol. 5, Mar. 31, 2009, pp. 575-579.

Carenini, et al., "Scalable Discovery of Hidden Emails from Large Folders", In Proceedings of the Eleventh ACM SIGKDD International Conference on Knowledge Discovery in Data Mining, Aug. 21, 2005, 4 Pages.

Casey, Keith, "Making Your Inbox Intelligent with Context.IO and Twilio", Retrieved from https://www.twilio.com/blog/2013/10/contexio-and-twilio.html, Oct. 10, 2013, 6 Pages.

Giacoletto, et al., "Automatic Expansion of Manual Email Classifications Based on Text Analysis", In Proceedings of International Conference on Ontologies, Databases and Applications of Semantics, Nov. 3, 2003, 18 Pages.

Greenstone, Scott, "Inbox by Gmail—Multiple Bundles", Retrieved From: http://www.scottgreenstone.com/2014/12/inbox-by-gmail-multiple-bundles.html, Dec. 23, 2014, 10 Pages.

Hachman, Mark, "Google in box is lousy; try it for yourself and see if you agree.", Retrieved From: http://www.greenbot.com/article/2877615/google-inbox-is-lousy-try-it-for-yourself-and-see-if-you-agree.html, Jan. 29, 2015, 5 Pages.

Munn, David, "Policy for managing email in the Greater London Authority", Retrieved From: https://www.london.gov.uk/moderngov/Data/Business%20Management%20and%20Administration%20Committee/20041201/Agenda/16%20Appendix%201%20PDF.pdf, Dec. 20, 2016, 15 Pages.

Muresan, et al., "Combining Linguistic and Machine Learning Techniques for Email Summarization", In Proceedings of Workshop on Computational Natural Language Learning, vol. 7, Jul. 6, 2001, 8 Pages.

Nguyen, Chuong, "Google Inbox's shareable Trip Bundles make it easier to coordinate travel.", Retrieved From: https://www.techradar.com/news/software/applications/google-inbox-s-shareable-trip-bundles-make-it-easier-to-coordinate-travel-1311158, Dec. 15, 2015, 10 Pages.

"International Search Report and Written Opinion Issued in PCT Application No. PCT/US2018/016782", dated May 15, 2018, 13 Pages.

"International Search Report & Written Opinion for PCT Application No. PCT/US18/016783", dated Mar. 21, 2018, 11 Pages.

"International Search Report and Written Opinion Issued in PCT Application No. PCT/US2018/016784", dated Apr. 30, 2018, 12 Pages.

"International Search Report and Written Opinion Issued in PCT Application No. PCT/US2018/016785", dated Mar. 27, 2018, 10 Pages.

Phadke, Gautam, Swapna, "Email Classification Using a Self-Learning Technique Based on User Preferences", In Partial Fulfillment of the Requirements for the Degree of Master of Science, Master Thesis of North Dakota State University, Oct. 2015, 55 Pages.

Rennie, J., "ifile: An Application of Machine Learning to E-Mail Filtering", In Proceedings of Sixth ACM SIGKDD International Conference on Knowledge Discovery and Data Mining Workshop on Text Mining, Aug. 20, 2000, 6 Pages.

Russell, Eleanor, "Guidelines on Developing a Policy for Managing Email.", In National Archives, Jan., 2004, 3 Pages.

Smith, Lauren, "A First Look at Inbox by Gmail: What Email Marketers Need to Know", Retrieved From: https://litmus.com/blog/a-first-look-at-inbox-by-gmail-what-email-marketers-need-to-know, Oct. 24, 2014, 11 Pages.

Smith, Lauren, "The Ultimate Guide to Preview Text Support", Retrieved from https://litmus.com/blog/the-ultimate-guide-to-preview-text-support, Apr. 29, 2015, 19 Pages.

Sorower, et al., "Improving Automated Email Tagging with Implicit Feedback", In Proceedings of 28th ACM Symposium on User Interface Software and Technology, Nov. 5, 2015, 11 Pages.

Standss, "Organizing Emails: Folders versus Tags", Retrieved From: http://www.standss.com/blog/index.php/organizing-emails-folders-tags/, Jan. 5, 2016, 7 Pages.

Tam, et al., "Automatic Foldering of Email Messages: a Combination Approach", In Proceedings of 34th European Conference on Advances in Information Retrieval., Apr. 1, 2012, 1 Page.

Thomas, et al., "Using a Sentence Compression Pipeline for the Summarization of Email Threads in an Archive", In Journal of Computer Sciences in Colleges, vol. 31, Issue 2, Dec. 1, 2015, 7 Pages.

Weverka, Peter, "Archiving Outlook Folders", Retrieved From: https://www.dummies.com/software/microsoft-office/outlook/archiving-outlook-folders/, Dec. 27, 2016, 3 Pages.

"Final Office Action Issued in U.S. Appl. No. 15/430,290", dated Mar. 17, 2020, 13 Pages.

"Notice of Allowance Issued in U.S. Appl. No. 15/430,327", dated Jul. 10, 2019, 15 Pages.

Arenas, et al., "SemFacet: Semantic Faceted Search over Yago", In Proceedings of the 23rd International Conference on World Wide Web, Apr. 7, 2014, 4 Pages.

"Non Final Office Action Issued in U.S. Appl. No. 15/430,290", dated Aug. 7, 2018, 8 Pages.

"Non Final Office Action Issued in U.S. Appl. No. 15/430,316", dated Oct. 17, 2018, 21 Pages.

"How can I Prevent Email Threads I have Assigned to a List from Appearing in my Inbox again", Retrieved From: https://sortd.freshdesk.com/support/solutions/articles/6000046083-how-can-i-prevent-email-threads-i-have-assigned-to-a-list-from-appearing-in-my-inbox-again-, Aug. 20, 2015, 1 Page.

"How to Make Your Own Labels in Google Inbox", Retrieved From: https://web.archive.org/web/20161222143019/http://www.wikihow.com:80/Make-Your-Own-Labels-in-Google-Inbox, Dec. 22, 2016, 6 Pages.

"How to Save Email Into Evernote", Retrieved From: https://web.archive.org/web/20161021055528/https://help.evernote.com/hc/en-us/articles/209005347-How-to-save-email-into-Evernote, Retrieved on: Oct. 21, 2016, 6 Pages.

"How to Use Bundles in Google Inbox", Retrieved From: https://web.archive.org/web/20170125202648/https://www.wikihow.com/Use-Bundles-in-Google-Inbox, Retrieved on: Jan. 25, 2017, 5 Pages.

"How to Use Google Inbox", Retrieved From: https://web.archive.org/web/20160810050026/https://www.wikihow.com/Use-Google-Inbox, Retrieved on: Aug. 10, 2016, 7 Pages.

"Inbox by Gmail 101", Retrieved From: https://web.archive.org/web/20150705015438/http://gmail-miscellany.blogspot.com:80/2014/10/inbox-by-gmail-101.html, Oct. 22, 2014, 14 Pages.

"Inbox by Gmail Help", Retrieved From: https://web.archive.org/web/20170208235410/https://support.google.com/inbox/?hl=en, Retrieved on: Feb. 8, 2017, 115 Pages.

"Threading Messages Together", Retrieved From: https://web.archive.org/web/20170128161844/https://api.slack.com/docs/message-threading, Retrieved on: Jan. 28, 2017, 13 Pages.

"View & Organize your Inbox", Retrieved From: https://web.archive.org/web/20160513074613/https://support.google.com/mail/topic/3394656?hl=en&ref_topic=3394150, Retrieved on: May 13, 2016, 43 Pages.

"Final Office Action Issued in U.S. Appl. No. 15/430,316", dated May 16, 2019, 38 Pages.

Aberdeen, et al., "The Learning Behind Gmail Priority Inbox", Retrieved From: https://web.archive.org/web/20150218101156/http://static.googleusercontent.com/media/research.google.com/en//pubs/archive/36955.pdf, Retrieved on: Feb. 18, 2015, 4 Pages.

(56) References Cited

OTHER PUBLICATIONS

Agarwal, Shalini, "A Bit about Bundles in in box", Retrieved From: https://web.archive.org/web/20161007091618/https://gmail.googleblog.com/2014/11/a-bit-about-bundles-in-inbox.html, Nov. 19, 2014, 5 Pages.

Biersdorfer, J D., "Use Labels to Sort Messages in Gmail", Retrieved From: https://web.archive.org/web/20161230040642/http://www.nytimes.com/2016/12/21/technology/personaltech/use-labels-to-sort-messages-in-gmail.html, Dec. 21, 2016, 2 Pages.

Einstein, Michael, "Email Processing and Triage Basics", Retrieved From: https://web.archive.org/web/20190426210912/https://michael-einstein.squarespace.com/blog/e-mail-triage-basics, May 29, 2014, 4 Pages.

Einstein, Michael, "Use Invisible Hashtags to Track Emails", Retrieved From: https://www.emailoverloadsolutions.com/blog/invisible-email-hashtags, Dec. 8, 2016, 5 Pages.

Einstein, Michael, "Using Outlook Categories: A Primer", Retrieved From: https://web.archive.org/web/20160503124600/https://www.emailoverloadsolutions.com/blog/using-e-mail-categories-a-primer, Jul. 22, 2014, 8 Pages.

Frost, Aja, "Tagging Tips: How to Organize Files and Other Information with Tags", Retrieved From: https://zapier.com/blog/how-to-use-tags-and-labels/#email, Aug. 11, 2016, 30 Pages.

Hiscott, Rebecca, "The Beginner's Guide to the Hashtag", Retrieved From: https://web.archive.org/web/20160206044144/https://mashable.com/2013/10/08/what-is-hashtag/, Oct. 8, 2013, 9 Pages.

Irish, Emily, "Forget in box Zero: Manage Your in box Better with These Smart Email Workflows", Retrieved From: https://zapier.com/blog/email-inbox-workflow/, Oct. 25, 2016, 23 Pages.

Kricfalusi, Elizabeth, "Stop the Email Threading Madness", Retrieved From: https://web.archive.org/web/20170606154125/https://techforluddites.com/email-turn-off-conversation-view-gmail-yahoo-outlook-ios/, May 16, 2017, 11 Pages.

Kricfalusi, Elizabeth, "Turn Off Email Grouping in Outlook", Retrieved From: https://web.archive.org/web/20160419205247/https://techforluddites.com/turn-off-email-grouping-in-outlook/, Jun. 30, 2015, 6 Pages.

Patkar, Mihir, "3 Secret Ways to Use Hashtags You've Never Tried Before", Retrieved From: https://web.archive.org/web/20160213160318/https://www.makeuseof.com/tag/3-secret-ways-to-use-hashtags-that-make-digital-searches-easier-faster/, Aug. 16, 2013, 6 Pages.

Pinola, Melanie, "Add Invisible Hashtags to Your Emails for Better Search and Organization", Retrieved From: https://zapier.com/blog/email-hashtags-tip/, Nov. 28, 2016, 4 Pages.

Pinola, Melanie, "How I Finally Organized My Messy in box with Sortd", Retrieved From: https://web.archive.org/web/20170107202606/https://lifehacker.com/how-i-finally-organized-my-messy-inbox-with-sortd-1754956174, Jan. 26, 2016, 8 Pages.

"Notice of Allowance Issued in U.S. Appl. No. 15/430,245", dated Oct. 14, 2020, 10 Pages.

"Notice of Allowance Issued in U.S. Appl. No. 16/585,359", dated Sep. 9, 2020, 18 Pages.

* cited by examiner

100

300

320

SEARCH AND FILTERING OF MESSAGE CONTENT

BACKGROUND

Traditional email clients allow users to search for content that is associated with a mailbox of a user. Currently, if a user does a keyword search for a query such as "travel" or "receipt", they get a messy set of results that likely does not consist of strictly "travel" emails and may be full of promotions, newsletters, and conversations that simply mention the word. This is because traditional email clients perform a non-intelligent keyword search when returning content that matches a search input.

As such, examples of the present application are directed to the general technical environment related to improving operation of an email service, where processing efficiency and usability are improved, among technical benefits.

SUMMARY

Non-limiting examples describe enhanced searching and filtering of message content by an application/service. Processing operations described herein are applicable to any type of message content that is associated with a data source (e.g. mailbox of a user of an email service). In one example, searching and filtering pertains to bundled content. As an example, a bundle of content may be a bundle of emails created within email service. A search input may be received through a user interface of an email service. The search input may be for searching emails associated with a mailbox the email service. Email results may be retrieved based on the received search input. In some examples, the email results may comprise one or more bundles of emails. The retrieved email results may be categorized into one or more categories. A smart filter may be generated for filtering the retrieved email results. An exemplary smart filter may comprise at least one filter field that corresponds to category specific content extracted from emails of a category of the one or more categories. The email results and the smart filter may be displayed through the user interface of the email service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Non-limiting examples of the present disclosure describe enhanced searching and filtering functionality for message content. As one example, message content may be a bundle of content such as a grouping of emails associated with an email service. User interface functionality for searching and filtering of bundled content are provided herein. Other aspects related to management of bundled content may be provided in related co-pending applications. While some examples may reference bundled content, it should be recognized that processing operations described herein are applicable to any type of message content (including individual message content).

Figure 1:
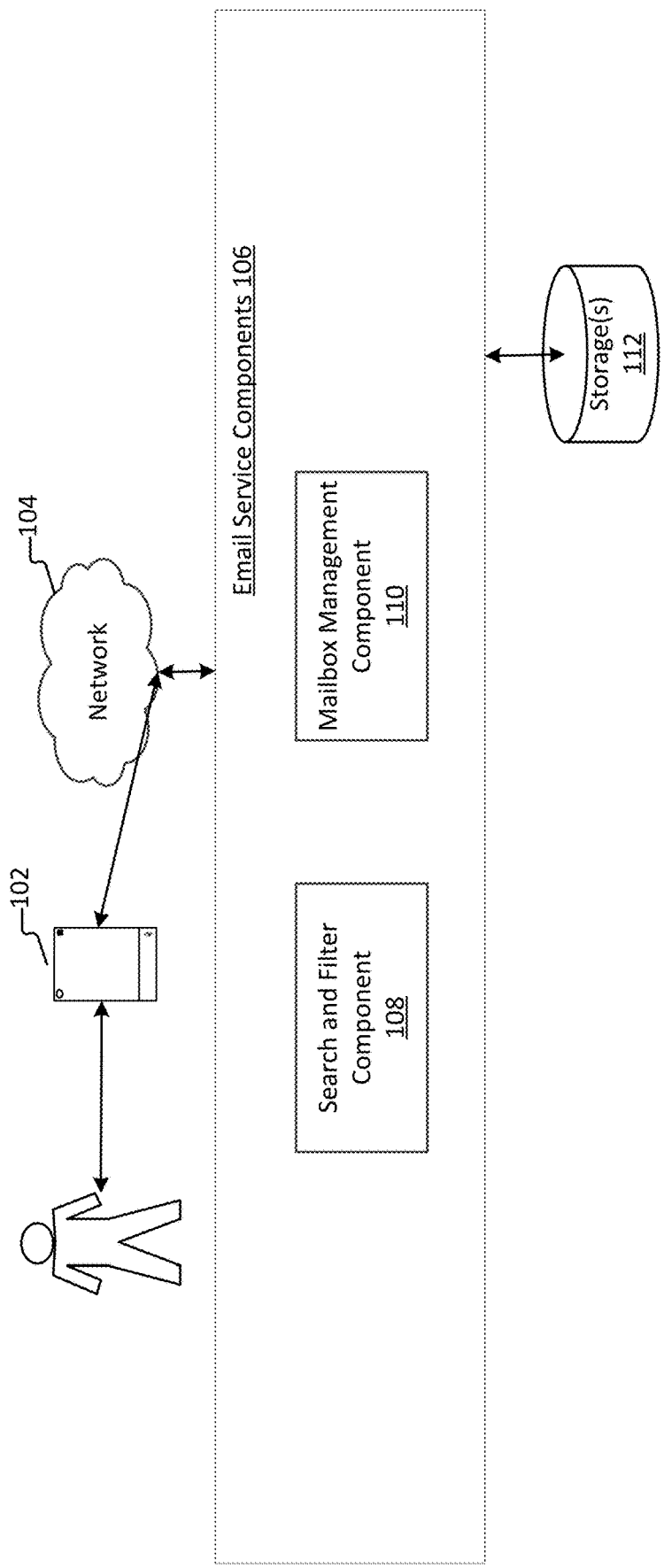
FIG. 1 illustrates an exemplary system implementable on one or more computing devices on which aspects of the present disclosure may be practiced.

FIG. 1 illustrates an exemplary system 100 implementable on one or more computing devices on which aspects of the present disclosure may be practiced. System 100 may be an exemplary system for execution of an email service with which aspects of the present disclosure may be practiced. Components of system 100 may be hardware components or software implemented on and/or executed by hardware components. In examples, system 100 may include any of hardware components (e.g., ASIC, other devices used to execute/run an OS, and software components (e.g., applications, application programming interfaces, modules, virtual machines, runtime libraries) running on hardware. In one example, an exemplary system 100 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 4-6. One or more components of system 100 may be configured to execute any of the processing operations described in at least method 200 described in the description of FIG. 2. In other examples, the components of systems disclosed herein may be spread across multiple devices. Exemplary system 100 comprises email service components 106 that further comprise: a search and filter component 108 and a mailbox management component 110.

One or more data stores/storages or other memory may be associated with system 100. For example, a component of system 100 may have one or more data storage(s) 112 (described below) associated therewith. Data associated with a component of system 100 may be stored thereon as well as processing operations/instructions executed by a component of system 100. Furthermore, it is presented that application components of system 100 may interface with other application services. Application services may be provided as platform resources referenced in the foregoing. Application services may be any resource that may extend functionality of one or more components of system 100.

Application services may include but are not limited to: personal intelligent assistant services, web search services, e-mail applications, word processing applications, spreadsheet applications, presentation applications, notes applications, calendaring applications, device management services, address book services, informational services, line-of-business (LOB) management services, customer relationship management (CRM) services, debugging services, accounting services, payroll services and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 100.

System 100 may comprise one or more storage(s) 112 that may store data associated with operation of one or more components of system 100. In examples, storage(s) 112 may interface with other components of system 100. Data associated with any component of system 100 may be stored in storage(s) 112, where components may be connected to storage(s) 112 over a distributed network including cloud computing platforms and infrastructure services. Exemplary storage(s) 112 may be any of a first-party source, a second-party source, and a third-party source. Storage(s) 112 are any physical or virtual memory space. Storage(s) 112 may store any data for processing operations performed by components of system 100, retained data from processing operations, stored programs, code or application programming interfaces (APIs), training data, links to resources internal and external to system 100 and knowledge data among other examples. Furthermore, in examples, components of system 100 may utilize knowledge data in processing by components of system 100. Knowledge may be used by one or more components of system 100 to improve processing of any of the email service components 106 where knowledge data can be obtained from resources internal or external to system 100. In examples, knowledge data may be maintained in storage(s) 112 or retrieved from one or more resources external to system 100 by knowledge fetch operation.

In FIG. 1, processing device 102 may be any device comprising at least one processor and at least one memory/storage. Examples of processing device 102 may include but are not limited to: processing devices such as desktop computers, servers, phones, tablets, phablets, slates, laptops, watches, and any other collection of electrical components such as devices having one or more processors or circuits. In one example processing device 102 may be a device of a user that is executing applications/services such as an exemplary email service (e.g. email client). An example of an email service is Outlook®. In examples, processing device 102 may communicate with the email service components 106 via a network 104. In one aspect, network 104 is a distributed computing network, such as the Internet. Email service components 106 may also communicate with application services via the network 104. Processing device 102 may be a device as described in the description of FIGS. 4-6. In some examples, processing device 102 may comprise multiple connected devices. Processing device 102 is an example of a user computing device.

The processing device 102 may execute processing operations that include an ability to access an application/service through a user account. In one example, processing device 102 may connect an authenticated user to an exemplary application/service that stores user data for one or more users of the application/service. For example, a user, utilizing processing device 102, may access an email service, where the email service may authenticate a user account of the user. The email service may access a mailbox management component 110 (of the email service components 106) to provide, to the processing device 102, a representation of a mailbox (of the email service) that is associated with the user account of the user.

An exemplary storage application/service may provide a user of processing device 102 with access to data stored in an exemplary data center. In one example, processing device 102 may be connected with storage(s) 112 via a distributed network, which may provide users with access to user data. One or more tenant resources (e.g. Tenant Resource A, Tenant Resource B, Tenant Resource C, etc.) may be associated with processing device 102. A tenant resource may be a user account associated with a processing device and/or distributed network service. Data associated with a tenant resource may be stored on storage(s) 112, where a tenant account can be utilized to access stored data by processing device 102 and/or other processing devices. Email service components 106 are components configured to execute processing operations to management of message content associated with a user mailbox of an email service. The email service components 106 are executed by one or more computing devices. An exemplary computing device may comprise one or more processors and memory, among other components. Examples of computing devices are provided in the description of at least FIGS. 4-6. As referenced above, the email service components 106 comprise: a search and filter component 108 and a mailbox management component 110.

The search and filter component 108 is configured to enhance searching and filtering capabilities of an exemplary email service. The search and filter component 108 enables intelligent searching and filtering related to message content. As described herein, exemplary entity tagging of message content enables enhanced searching and filtering functionality for management of message content. Message content may comprise individual messages and/or bundled content (e.g. bundles of emails). User interface examples related to searching and filtering of email content are provided in at least FIGS. 3A and 3B. Processing operations described in relation to the search and filter component 108 may also be applicable to data associated with other application/services such as platform resources that may comprise a suite of different applications. In one example, message content associate with an email service is provided in addition to other types of content retrieved from other applications/services. For instance, a user interface may be affiliated with a suite of applications, where content is surfaced for some or all of the suite of applications.

In traditional email services, if a user does a keyword search for a query such as "travel" or "receipt", they get a messy set of results that likely does not consist of strictly "travel" emails. As an example, an email may make a single mention of a word such as travel, where a keyword search picks up on this and returns an unrelated email as a primary result when that email is more likely related to a promotion, newsletter, miscellaneous conversation, etc. An exemplary search and filter component 108 is configured to remedy instances where inaccurate search results are returned by applying modeling that evaluates attributes related to exemplary entity type tagging infrastructures when returning query results.

For instance, the search and filter component 108 is configured to execute a machine learning model may be applied that is configured to identify tags (associated with entity type tagging infrastructures) and prioritize search results that have tags that are closely associated with a query of a user. The search and filter component 108 utilizes exemplary entity type tagging infrastructures to organize search result content for a user. For example, top returned results may be based on highest confidence matches from evaluation of entity type tagging structures where lower confidence matches are de-prioritized in a listing of search results.

As described above, message content may comprise bundled message content. Custom bundles (e.g. bundles of emails) may be created either by a user or by an email service on behalf of a user. Custom bundles are a lightweight mechanism for managing associations between content (e.g. emails where a bundle of emails may be created). A bundle can be defined as an automatic of manually set grouping of like items. As an example, a bundle may be created to group two or more email messages of an email service, creating a bundle of emails. An exemplary bundle of emails may comprise a grouping of at least two separate email threads. The bundle of emails may further comprise an exemplary tag, providing an association to an entity type tagging structure. An exemplary entity type tagging structure can be utilized to classify emails of an email service including bundled emails. Data associated with the entity type tagging structure (including an exemplary tag) can be used to assist with searching and filtering of email data including bundles of emails. Further examples may reference exemplary tags in relation to bundled content. However, exemplary tags (and other data of an entity type tagging structure) may be associated with individual message content as well as bundles message content.

An exemplary tag is further used to associate email messages and content of the bundle (e.g. bundle of emails). The tag associates an email message (and/or other content) with one or more additional email (and/or other content). In one example, an exemplary tag is a hashtag. However, tags are not limited to such a form. Created tags become entity values that can be used to efficiently associate emails of a bundle. Tags further become entity data that can be used to prioritize searching and retrieval of created bundles. In some instances, tags may remain associated with a bundle even when a message is separated from a bundle. This may assist users with being able to quickly relocate an email during a subsequent search. In alternative examples, an email that was previously associated with a bundle and later removed may not retain an association to an exemplary tag.

Message content may be tagged with a name/tag ID as part of an entity type tagging infrastructure. In one example, an entity type tagging infrastructure may be used for the assignment and management of tags associated with message content (e.g. bundles of emails). That is, an entity type tagging structure may be generated for specific emails included in a bundle of emails. The entity type tagging structure may comprise a plurality of fields that are configured by developers, where data of the entity type tagging infrastructure can be utilized for management of content associated with a bundle including searching and filtering of bundles of content and sharing of bundled content. Attributes and fields associated with an exemplary entity type tagging infrastructure may vary based on the type of email content. In further examples, an entity type tagging infrastructure may be used for classification of any type of emails including emails not included in a bundle of emails as data from an entity type tagging infrastructure may be utilized to increase accuracy in classifying emails as a specific type or category. Examples of data fields that may be included in an exemplary entity type tagging infrastructure comprise but are not limited to: context fields pertaining to specific data of an email, tag/hashtag fields, email type fields, category fields, entity data fields, data source fields, date/timestamp information, hyperlink data fields, domain information fields, formatting/arrangement fields, confidence scores pertaining to classification and specific attributes of an email, data pertaining to specific email content and user triage action history with respect to specific messages (e.g. emails) and/or a category/type for the specific message, among other examples.

In examples where message content comprises an exemplary bundle of content, it is noted that bundling of content is contextually relevant and presented inline with other message content of an existing email experience. An email service is configured to create bundles of content on behalf of a user based on meaningful categories for the user/groups of users. This is a better solution than folders, labels or setting of email rules because a created bundle is ephemeral in nature. Bookmarked links such as folders/labels are not required to be created within a navigational pane of a user interface of an email service. Further, bundled content is automatically updated and intelligently managed by an email service, where bundled content can be automatically updated based on changes to message content associated with a user mailbox. If the topic item becomes irrelevant, a bundle would drop off (e.g. de-prioritize), but the bundle structure would still remain intact allowing for a bundle to be found later without requiring a physical link to be created and managed within a navigational pane of an email service (i.e. as with folders/labels). If a bundle receives a new message or update that may be relevant to a user (e.g. meeting appointment, tracking of shipment, notification, etc.), the bundle would be prioritized in a mailbox of a user. Notably, once a bundle is created in an email service, subsequent email messages from bundled message threads may result in update to the created bundle, where a user would not have to go looking for individual messages/ message threads.

Furthermore, the search and filter component 108 may be configured to provide auto-complete suggestions for search queries based on data associated with entity type tagging infrastructures. For instance, search queries entered through an email service may be evaluated for matches with exemplary tags (e.g. associated with entity type tagging infrastructures). In one example, the search and filter component 108 may prioritize auto-complete suggestions that are associated with identified tags when there is a match (or partial match) with a query entered by a user. Processing operations and modeling for query processing and matching of content to entity type data is known to one skilled in the art.

Moreover, the search and filter component 108 is configured to provide intelligent filter modifiers when returning search results for message content, where the filter modifiers may intelligently vary based on the categorization/classification of the search results. Traditional email services conduct very non-intelligent keyword searches when returning email search results. Likewise, when a user completes a keyword search using a traditional email service, the email service provides the user with a given a generic or basic set of filter modifiers for their query, such as sender domain, attachments, and date, among other examples.

An exemplary search and filter component 108 is configured to enhance the filtering capabilities of an email service by presenting smart filters and modifiers that pertain a category or type of an email result. An exemplary smart filter leverages content/metadata that is extracted from a category of emails, to provide more intelligent filtering options for a user. Metadata properties and fields exist within an entity document that exist at transport/delivery of email message content. The search and filter component 108 is configured to enable users to filter search results based upon metadata and fields that are specific to a category that is associated with a search result. For instance, a categorization of travel emails may enable users to filter search results by metadata such as destination, receipt date, receipt category, and travel type, among other examples.

An exemplary smart filter may comprise multiple fields and may update based on a selection of a specific category of emails results, where the selection may be made through a UI of an email service. A visual example of an exemplary smart filter is provided in FIG. 3A. In one example, a smart filter may be presented, through a UI of an email service, in addition to a set of basic or generic filters used for organizing search results. Further, a categorization or classification for email data may be an association to a user-created bundle and/or an auto-generated bundle (e.g. bundles automatically generated by an email service). The smart filter may comprise UI features that enable a user to sort email search results in accordance with categorizations of created bundles as well as other message content.

The mailbox management component 110 is a component configured to manage email data associated with a user account of an email service and provide a representation of a mailbox (of the email service) that is associated with the user account of the user. The mailbox management component 110 may retrieve email data associated with the user account and generate a representation of a mailbox for the user. An exemplary representation of the mailbox may be provided through an email service (e.g. executing on a processing device such as processing device 102). Generation of a representation of a mailbox of a user is known to one skilled in the art. Moreover, the mailbox management component 110 may interface with the search and filter component 108 to enable searching and filtering of message content. In one example, auto-complete suggestions (e.g. tailored to bundled content) may be communicated from the search and filter component 108 to the mailbox management component 110 for inclusion within a UI representation of a user mailbox. In another example, smart filter modifiers, generated by the search and filter component 108, may be included in a generated representation of a mailbox of the user. Updates to UI menu options including smart filter modifiers may be communicated with the search and filter component 108, where the search and filter component 108 communicates with the mailbox management component 110 to update display of a UI of an email service based on updates to search queries and UI selections made by a user.

Figure 2:
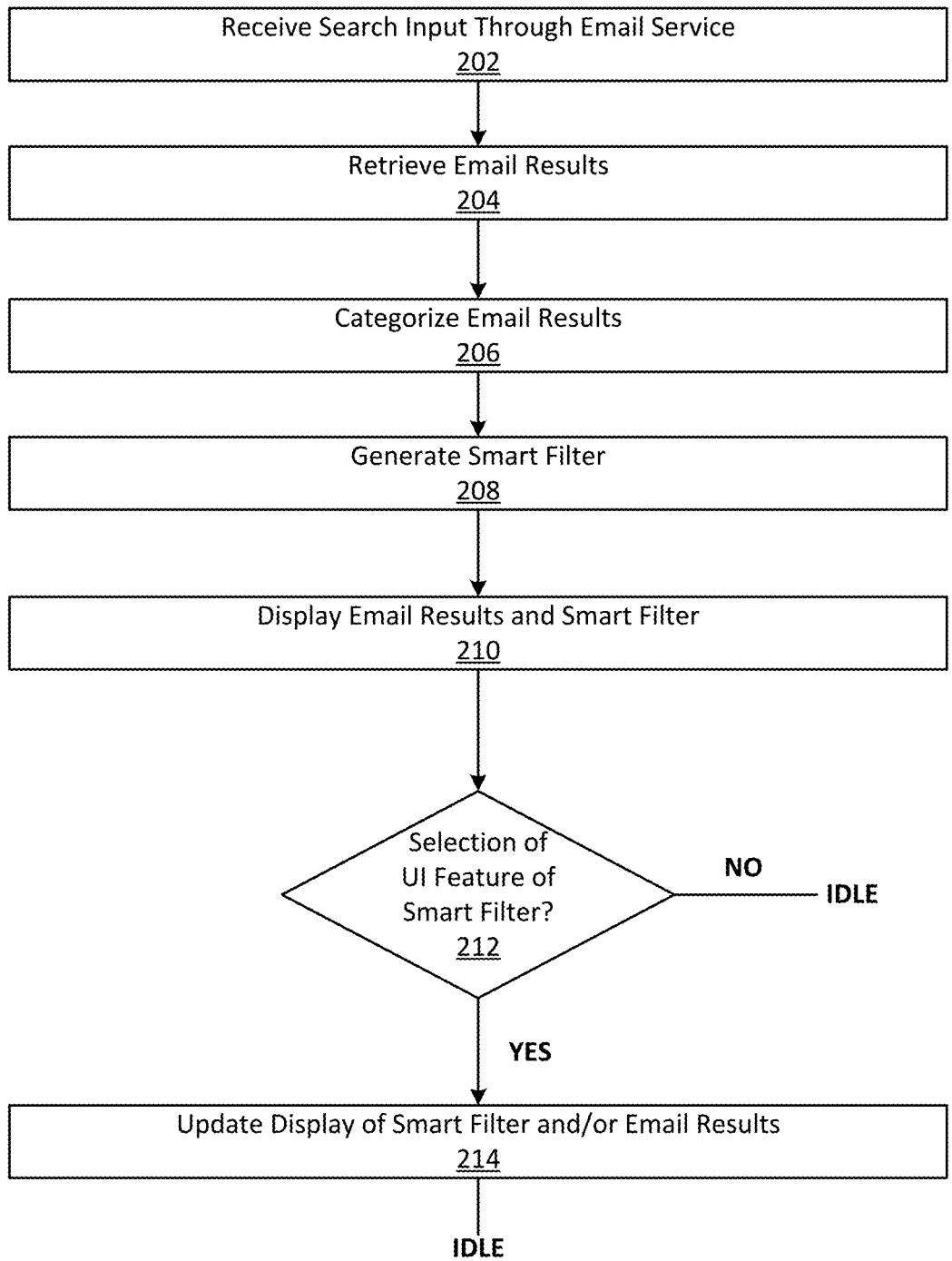
FIG. 2 is an exemplary method related to searching and filtering of message content with which aspects of the present disclosure may be practiced.

FIG. 2 is an exemplary method 200 related to searching and filtering of message content with which aspects of the present disclosure may be practiced. As an example, method 200 may be executed by an exemplary processing device and/or system such as those shown in FIGS. 4-6. In examples, method 200 may execute on a device comprising at least one processor configured to store and execute operations, programs or instructions. Operations performed in method 200 may correspond to operations executed by a system and/or service that execute computer programs, application programming interfaces (APIs), neural networks or machine-learning processing, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of application/services, devices, knowledge resources, etc. Processing operations described in method 200 may be implemented by one or more components connected over a distributed network, for example, as described in system 100 (of FIG. 1).

Method 200 begins at processing operation 202, where search input is received through a user interface of an email service. The search input may be for searching message content (e.g. emails) associated with a mailbox the email service. Further description related to management of searches within an email service is provided in at least the description of the search and filter component 108 (of FIG. 1).

Flow may proceed to processing operation 204, where email results may be retrieved based on the received search input. In some examples, the email results may comprise one or more bundles of emails but may also comprise other emails within a mailbox of a user account. Further description related to the retrieval of email results is provided in at least the description of the search and filter component 108 (of FIG. 1).

At operation 206, retrieved email results may be categorized into one or more categories. An exemplary email service may be configured to enable intelligent searching and filtering related to bundled content (e.g. bundles of emails) based on exemplary tags (e.g. exemplary entity type tagging infrastructure). The search and filter component 108 (of FIG. 1) may be configured to utilize exemplary entity type tagging infrastructures to organize and categorize search result content for a user. As an example, a machine learning model may be applied that correlates the search input with an entity type classification (e.g. associated with an entity type tagging infrastructure). The entity type classification corresponds with an exemplary tag that may be associated with a specific email or bundle of emails. In one example, processing operation 206 may determine categories for email results that are associated with an exemplary tag. That is, a tag is correlated with one or more category classifications. Email specific content from such classifications can be used to generate intelligent filters modifiers for retrieved search results.

Flow may proceed to processing operation 208, where a smart filter is generated. A smart filter may be generated for filtering the retrieved email results. An exemplary smart filter may comprise at least one filter field that corresponds to category specific content extracted from emails of a category of the one or more categories. Category specific content corresponds to metadata, extracted by an exemplary machine learning model, from specific email results of the one or more categories. Such data can be used to filter retrieved email results, while providing filters that are most contextually relevant to the content included in the retrieved search results. Further description related generation (and components of) an exemplary smart filter is provided in at least the description of the search and filter component 108 (of FIG. 1) as well as the description of FIG. 3A (providing a visual example of an exemplary smart filter).

At processing operation 210, the retrieved email results and the smart filter may be displayed through the user interface of the email service. In alternative examples, the email service may be configured to provide a set of basic filters for filtering the retrieved email results. An exemplary smart filter may be displayed in in addition to the set of basic filters provided by an email service.

Flow may proceed to decision operation 212, where it is determined whether a UI feature of a smart filter is selected. If no selection occurs within the smart filter fields, flow of method 200 branches NO and processing remains idle. If a selection occurs of a UI feature within the smart filter, flow of method 200 branches YES and proceeds to processing operation 214. At processing operation 214, a display of a smart filter may be updated. For example, a user may select a UI feature associated with a specific category to re-filter the retrieved email results. In such an example, filter modifiers associated with the smart filter may updated based on the category change. Additionally, the email results may be filtered based on selected changes to the filtering fields of the smart filter. In one example, a user may select to change a category associated with a smart filter, prompting the smart filter to dynamically update its display to provide contextually relevant filter fields for the selected category. A user may provide a UI selection in one or more of the new filter fields resulting in a re-filtering of the search results.

Figure 3A:
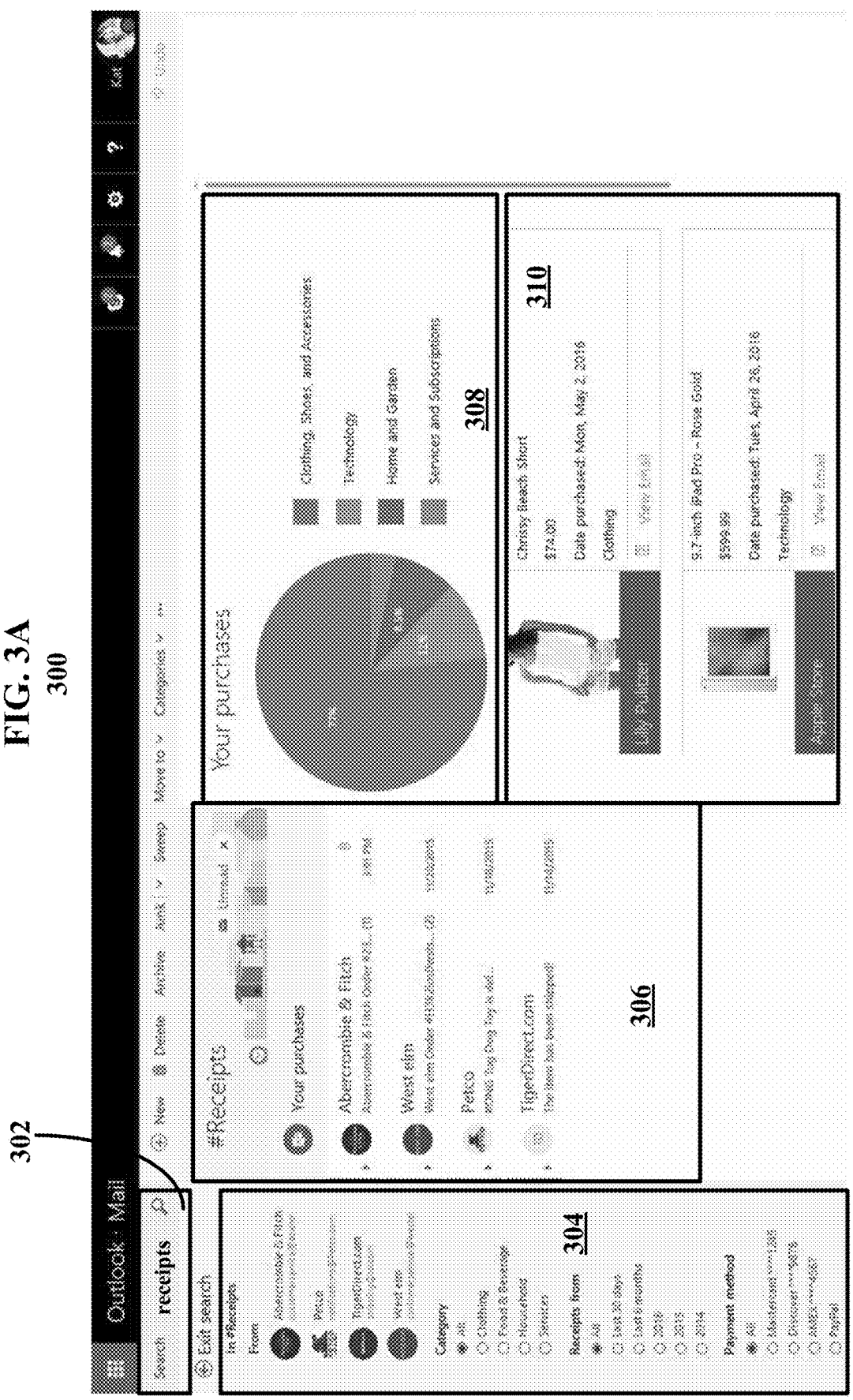
FIGS. 3A-3B provide user interface views illustrating user interface examples for searching and filtering of emails in an email service, with which aspects of the present disclosure may be practiced.
Figure 3B:
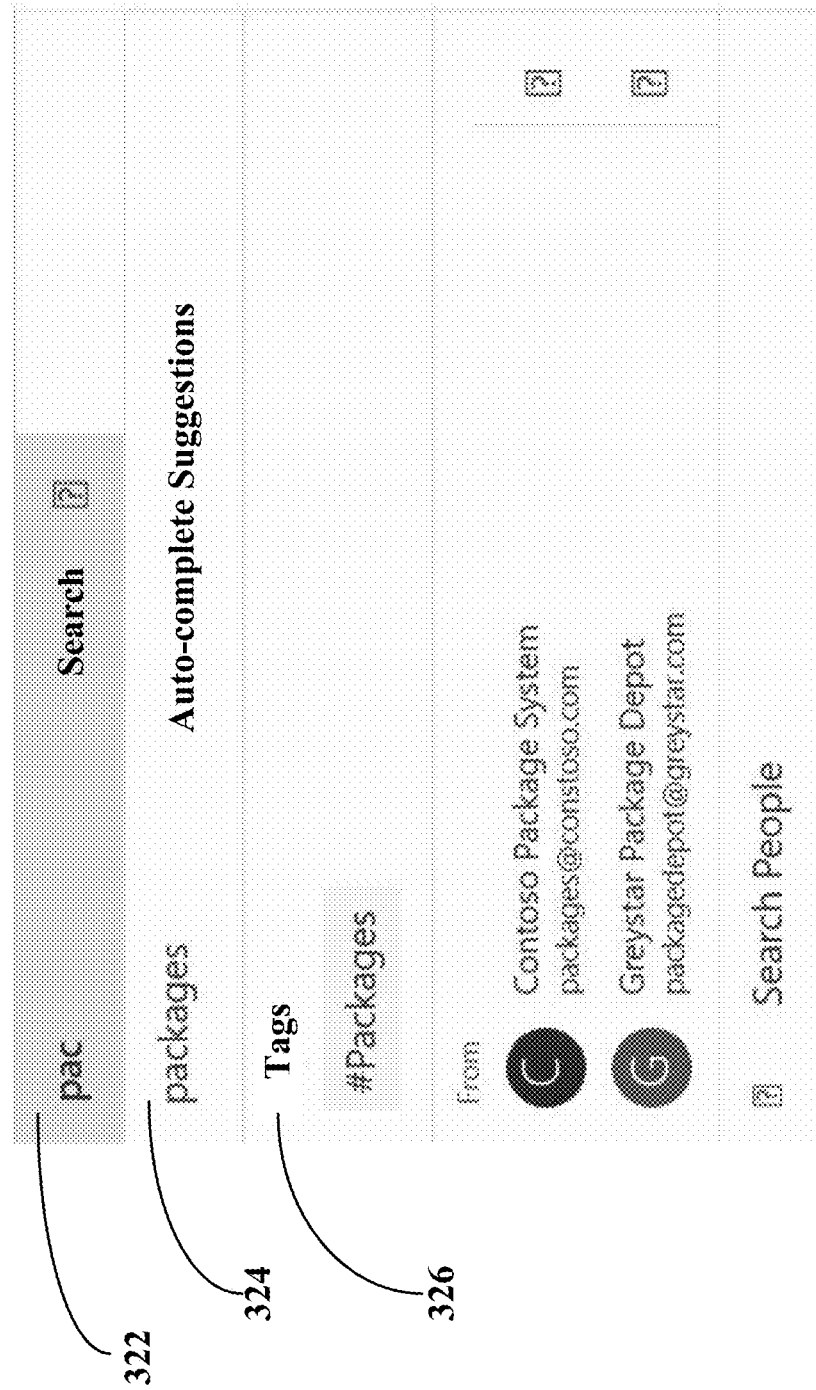

FIGS. 3A-3B provide user interface views illustrating user interface examples for searching and filtering of emails in an email service, with which aspects of the present disclosure may be practiced.

FIG. 3A illustrates user interface view 300, which provides a display of searching and filtering for a mailbox of an exemplary email service. Processing operations related to searching and filtering are described in at least the description of the search and filter component 108 of FIG. 1. User interface view 300 comprises a search field 302, where a user enters a search query of "receipts". Email results 306 are returned based on the search query entered in the search field 302. As described in the foregoing, exemplary tags related to bundled content may be prioritized in the search and retrieval of message content (e.g. #receipts).

Furthermore, user interface view 300 comprises an exemplary smart filter 304 as described in the description of the search and filter component 108 (FIG. 1). An exemplary smart filter 306 may comprise UI fields that enable a user to filter the email results 306 by category/classification. Additional UI fields of the smart filter 304 may change/update based on selection of a specific categorization for the email results 306. In one example, a smart filter 304 may default to displaying individual filters/modifiers that are associated with "all" categories of the email results 306. Users can manipulate display of fields of the smart filter 304 (e.g. collapsed view, expanded view). In some instances, display of fields associated with a smart filter 304 may vary based on a version of an email service that is executing (e.g. mobile version) and/or available display space for displaying an exemplary email service. User interface view 300 further comprises display of exemplary rich content previews 308 and 310 that may be associated with a bundle of emails (e.g. #receipts). Rich content preview 308 provides summary data related to message content that is associated with retrieved email results 306. Rich content preview 310 displays visual representations of specific message content included in email results 306. In examples, the rich content preview 310 comprises actionable links that enable users to take actions with respect to specific emails without actually opening the emails.

FIG. 3B illustrates user interface view 320, which provides a display for searching and filtering in an exemplary email service. Processing operations related to searching and filtering are described in at least the description of the search and filter component 108 of FIG. 1. User interface view 320 may be an extension of search field 302 (illustrated in user interface view 300, FIG. 3A). As an example, a user interface of an email search may be configured to overlay additional UI features over search field 302 for assisting a user with a search query. In the example shown in user interface view 320, a user is entering a search query of "pac" into a search field 322. Among other pertinent data, an exemplary email service may provide auto-complete suggestions in an auto-complete suggestion field 324 for a user search query. In the example shown in user interface 320, an exemplary auto-complete suggestion is "packages". Further, exemplary tags that may match a user search query are identified for a user in a tags field 326 (e.g. #packages). Additional field (e.g. identification of sender domains, users/people, cross-application references, etc.) may also be provided for a user to assist with providing comprehensive search results for a user.

Figure 4:
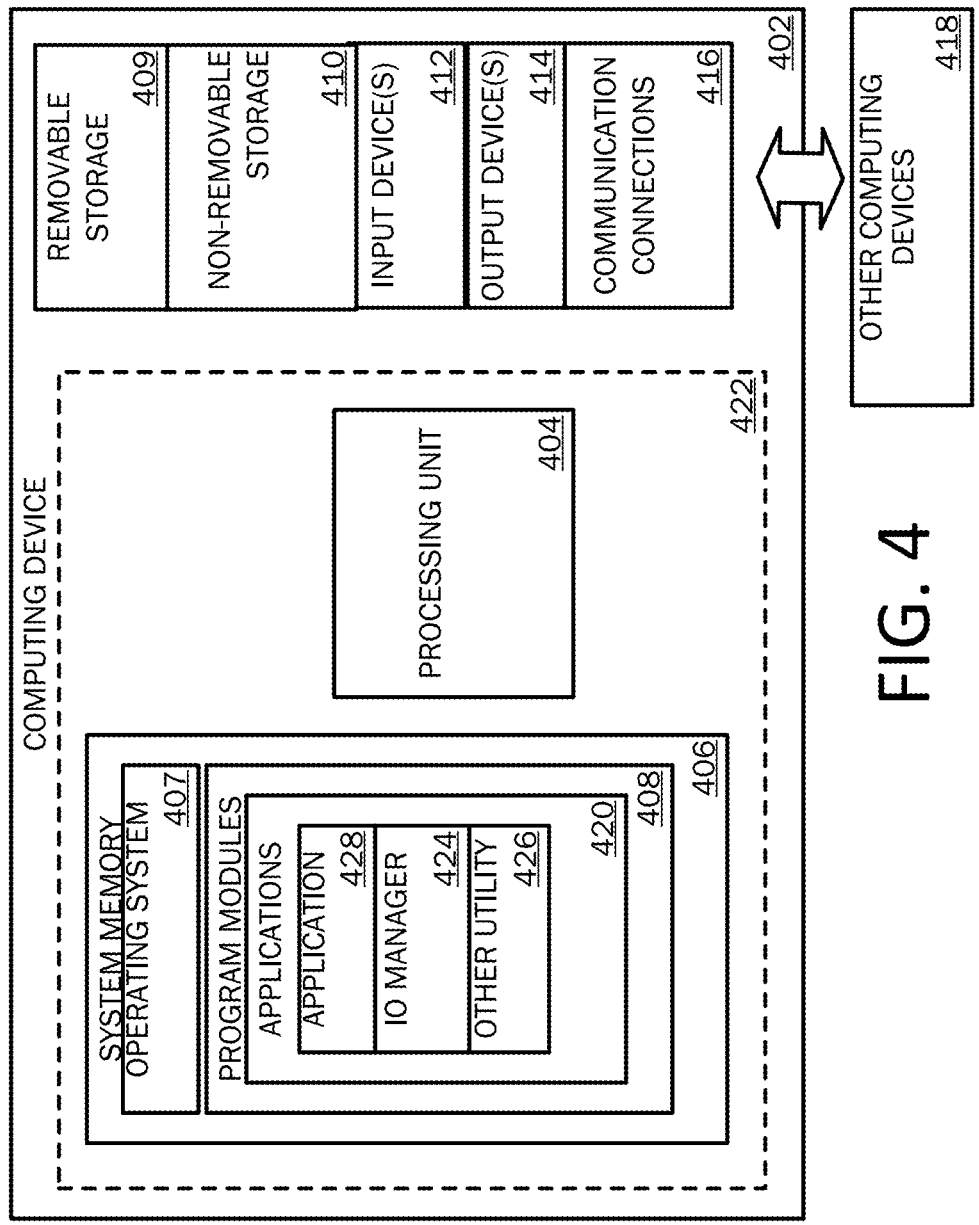
FIG. 4 is a block diagram illustrating an example of a computing device with which aspects of the present disclosure may be practiced.
Figure 5A:
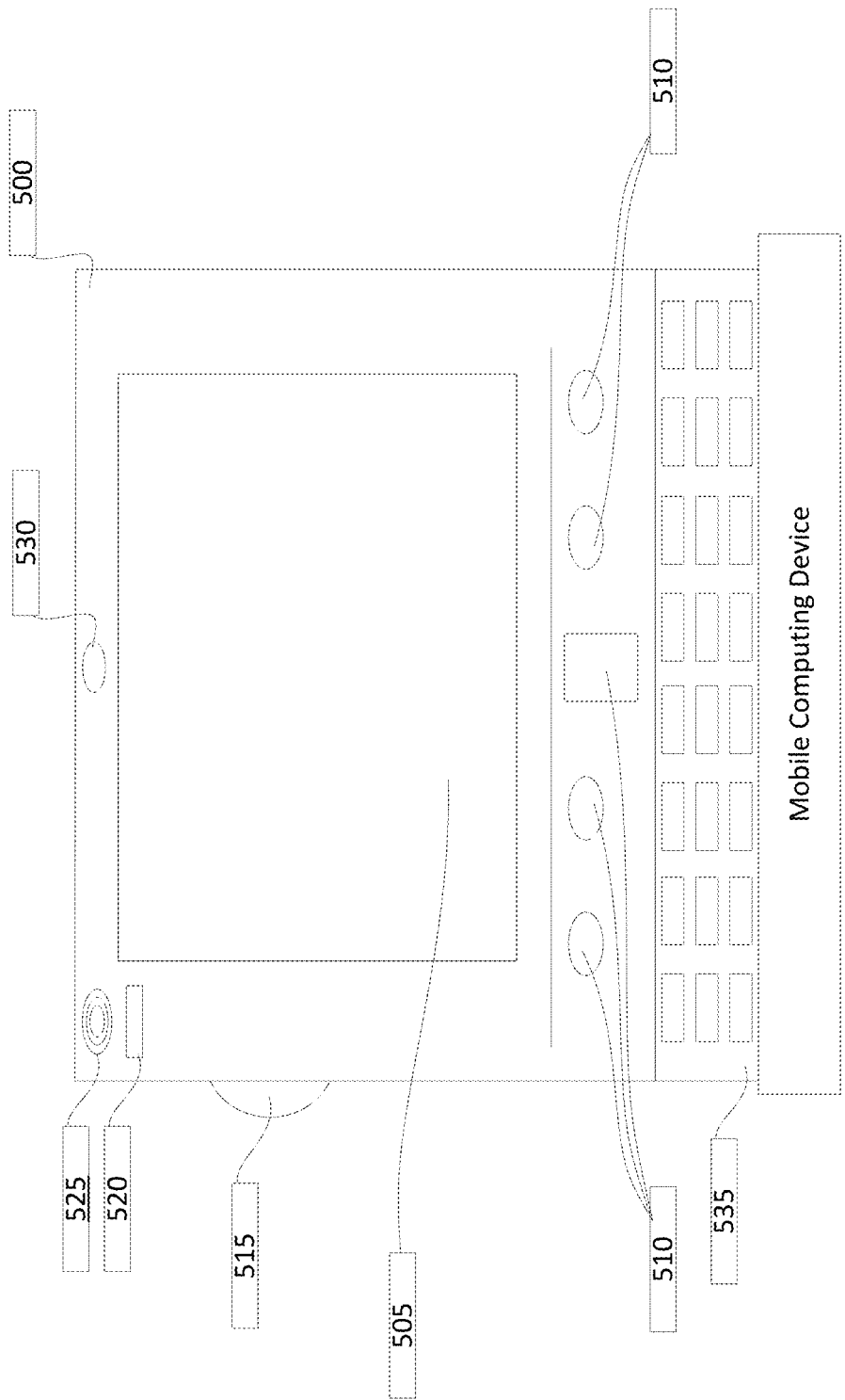
FIGS. 5A and 5B are simplified block diagrams of a mobile computing device with which aspects of the present disclosure may be practiced.
Figure 5B:
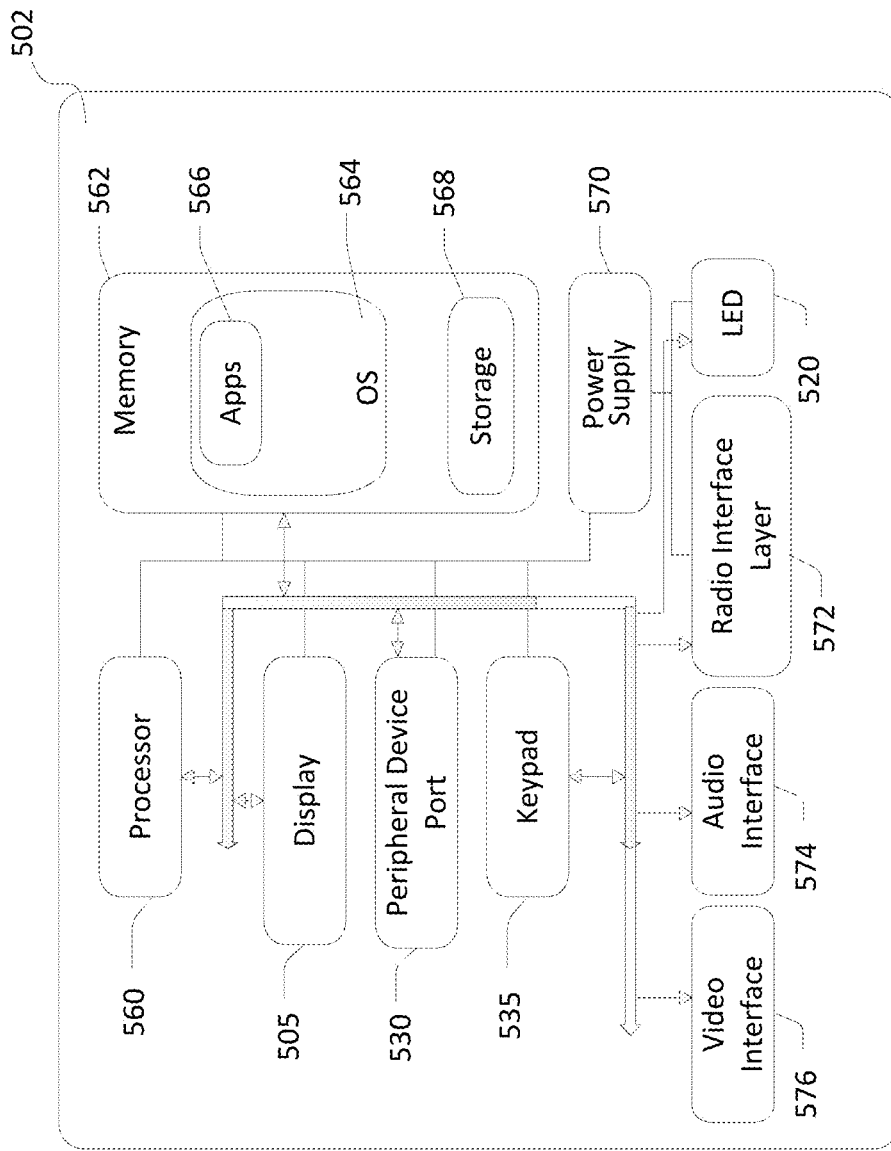
Figure 6:
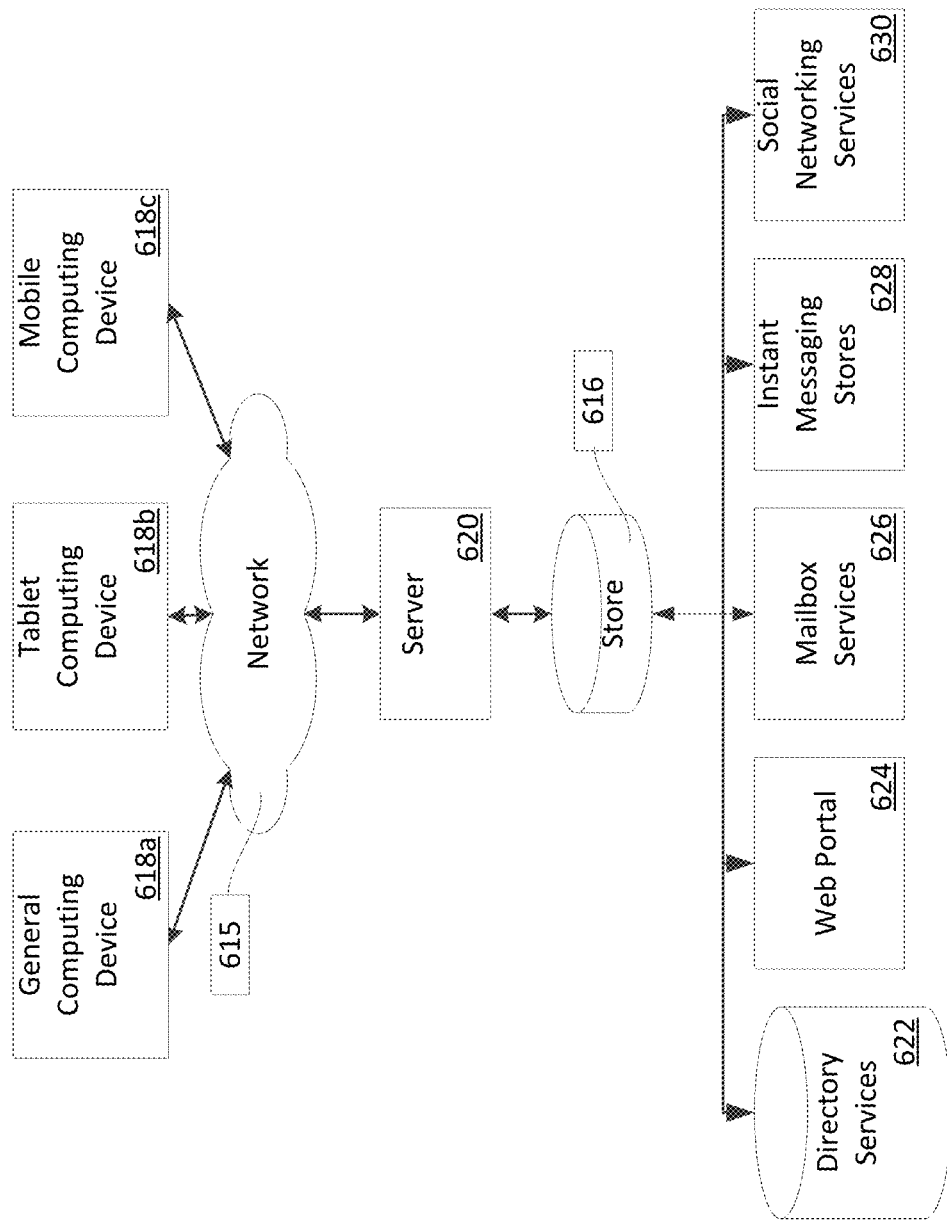
FIG. 6 is a simplified block diagram of a distributed computing system in which aspects of the present disclosure may be practiced.

FIGS. 4-6 and the associated descriptions provide a discussion of a variety of operating environments in which examples of the invention may be practiced. However, the devices and systems illustrated and discussed with respect to FIGS. 4-6 are for purposes of example and illustration and are not limiting of a vast number of computing device configurations that may be utilized for practicing examples of the invention, described herein.

FIG. 4 is a block diagram illustrating physical components of a computing device 402, for example a mobile processing device, with which examples of the present disclosure may be practiced. Among other examples, computing device 402 may be an exemplary computing device configured for execution of an email service as described herein. In a basic configuration, the computing device 402 may include at least one processing unit 404 and a system memory 406. Depending on the configuration and type of computing device, the system memory 406 may comprise, but is not limited to, volatile storage (e.g., random access memory), non-volatile storage (e.g., read-only memory), flash memory, or any combination of such memories. The system memory 406 may include an operating system 407 and one or more program modules 408 suitable for running software programs/modules 420 such as IO manager 424, other utility 426 and application 428. As examples, system memory 406 may store instructions for execution. Other examples of system memory 406 may store data associated with applications. The operating system 407, for example, may be suitable for controlling the operation of the computing device 402. Furthermore, examples of the invention may be practiced in conjunction with a graphics library, other operating systems, or any other application program and is not limited to any particular application or system. This basic configuration is illustrated in FIG. 4 by those components within a dashed line 422. The computing device 402 may have additional features or functionality. For example, the computing device 402 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 406. While executing on the processing unit 404, program modules 408 (e.g., Input/Output (I/O) manager 424, other utility 426 and application 428) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 402 may also have one or more input device(s) 412 such as a keyboard, a mouse, a pen, a sound input device, a device for voice input/recognition, a touch input device, etc. The output device(s) 414 such as a display, speakers, a printer, etc. may also be included. The aforementioned devices are examples and others may be used. The computing device 404 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 406, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 402. Any such computer storage media may be part of the computing device 402. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a personal data assistant, a tablet personal computer, a phablet, a slate, a laptop computer, and the like, with which examples of the invention may be practiced. Mobile computing device 500 may be an exemplary computing device configured for execution of an email service as described herein. Application command control may be provided for applications executing on a computing device such as mobile computing device 500. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 5A, one example of a mobile computing device 500 for implementing the examples is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., touch screen display). If included, an optional side input element 515 allows further user input. The side input element 515 may be a rotary switch, a button, or any other type of manual input element. In alternative examples, mobile computing device 500 may incorporate more or less input elements. For example, the display 505 may not be a touch screen in some examples. In yet another alternative example, the mobile computing device 500 is a portable phone system, such as a cellular phone. The mobile computing device 500 may also include an optional keypad 535. Optional keypad 535 may be a physical keypad or a "soft" keypad generated on the touch screen display or any other soft input panel (SIP). In various examples, the output elements include the display 505 for showing a GUI, a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 can incorporate a system (i.e., an architecture) 502 to implement some examples. In one examples, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA), tablet and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device (e.g. system 502) described herein.

The system 502 has a power supply 570, which may be implemented as one or more batteries. The power supply 570 might further include an external power source, such as an AC adapter or a powered docking cradle that supplements or recharges the batteries.

The system 502 may include peripheral device port 530 that performs the function of facilitating connectivity between system 502 and one or more peripheral devices. Transmissions to and from the peripheral device port 530 are conducted under control of the operating system (OS) 564. In other words, communications received by the peripheral device port 530 may be disseminated to the application programs 566 via the operating system 564, and vice versa.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525 (as described in the description of mobile computing device 500). In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525 (shown in FIG. 5A), the audio interface 574 may also be coupled to a microphone to receive audible input, such as to facilitate a telephone conversation. In accordance with examples of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one example of the architecture of a system for providing an application that reliably accesses target data on a storage system and handles communication failures to one or more client devices, as described above. The system of FIG. 6 may be an exemplary system configured for execution of an email service as described herein. Target data accessed, interacted with, or edited in association with programming modules 408 and/or applications 420 and storage/memory (described in FIG. 4) may be stored in different communication channels or other storage types. For example, various documents may be stored using a directory service 622, a web portal 624, a mailbox service 626, an instant messaging store 628, or a social networking site 630, application 428, IO manager 424, other utility 426, and storage systems may use any of these types of systems or the like for enabling data utilization, as described herein. A server 620 may provide storage system for use by a client operating on general computing device 402 and mobile device(s) 500 through network 615. By way of example, network 615 may comprise the Internet or any other type of local or wide area network, and a client node may be implemented for connecting to network 615. Examples of a client node comprise but are not limited to: a computing device 402 embodied in a personal computer, a tablet computing device, and/or by a mobile computing device 500 (e.g., mobile processing device). As an example, a client node may connect to the network 615 using a wireless network connection (e.g. WiFi connection, Bluetooth, etc.). However, examples described herein may also extend to connecting to network 615 via a hardwire connection. Any of these examples of the client computing device 402 or 500 may obtain content from the store 616.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
receiving a search input for search of emails associated with a mailbox of the email service;
retrieving emails results based on the received search input;
generating a smart filter, configured for filtering email content, that comprises sub-filter fields identifying a plurality of entity-specific tags specific to a categorical entity classification of the email content, wherein the sub-filter fields of the smart filter are selected based on a result of application of trained machine learning processing that executes processing operations comprising:
categorizing the email results into one or more categorical entity classifications based on an analysis of a type of content associated with the retrieved email results,
selecting a category, from the one or more categorical entity classifications, wherein the selecting identifies a subset of the email results specific to the category,
analyzing metadata for the subset of the email results specific to the category,
identifying the plurality of entity-specific tags based on a result of analyzing the metadata for the subset of the email results specific to the category,
selecting the sub-filter fields based on a result of analyzing the plurality of entity-specific tags, and
generating the smart filter to comprise the sub-filter fields specific to the category; and
transmitting data associated with the smart filter for rendering of the smart filter through the email service.

2. The method of claim 1, wherein the retrieving further comprises applying trained machine learning processing that correlates the search input with an entity type classification, and wherein the categorizing categorizes the email results based on the entity type classification.

3. The method of claim 2, wherein the entity type classification corresponds with a tag that is associated with a bundle of emails comprises an aggregation of two or more email threads, and wherein the categorizing determines categories for email results that are associated with the tag.

4. The method of claim 1, further comprising: transmitting, for rendering, data associated with a set of basic filters for filtering the email results, wherein the data associated with the set of basic filters is utilized for rendering of the set of basic filters, displayable along with the smart filter, through the email service.

5. A system comprising:
at least one processor; and
a memory operatively connected with the at least one processor storing computer-executable instructions that, when executed by the at least one processor, causes the at least one processor to execute a method that comprises:
receiving a search input for search of emails associated with a mailbox of the email service;
retrieving emails results based on the received search input;
generating a smart filter, configured for filtering email content, that comprises sub-filter fields identifying a plurality of entity-specific tags specific to a categorical entity classification of the email content, wherein the sub-filter fields of the smart filter are selected based on a result of application of trained machine learning processing that executes processing operations comprising:
categorizing the email results into one or more categorical entity classifications based on an analysis of a type of content associated with the retrieved email results,
selecting a category, from the one or more categorical entity classifications, wherein the selecting identifies a subset of the email results specific to the category,
analyzing metadata for the subset of the email results specific to the category,
identifying the plurality of entity-specific tags based on a result of analyzing the metadata for the subset of the email results specific to the category,
selecting the sub-filter fields based on a result of analyzing the plurality of entity-specific tags, and
generating the smart filter to comprise the sub-filter fields specific to the category; and
transmitting data associated with the smart filter for rendering of the smart filter through the email service.

6. The system of claim 5, wherein the retrieving further comprises applying trained machine learning processing that correlates the search input with an entity type classification, and wherein the categorizing categorizes the email results based on the entity type classification.

7. The system of claim 6, wherein the entity type classification corresponds with a tag that is associated with a bundle of emails comprises an aggregation of two or more email threads, and wherein the categorizing determines categories for email results that are associated with the tag.

8. The system of claim 5, wherein the method, executed by the at least one processor, further comprises: transmitting, for rendering, data associated with a set of basic filters for filtering the email results, wherein the data associated with the set of basic filters is utilized for rendering of the set of basic filters, displayable along with the smart filter, through the email service.

9. A computer-readable medium storing computer-executable instructions that, when executed by at least one processor, causes the at least one processor to execute a method comprising:
receiving a search input for search of emails associated with a mailbox of the email service;
retrieving emails results based on the received search input;
generating a smart filter, configured for filtering email content, that comprises sub-filter fields identifying a plurality of entity-specific tags specific to a categorical entity classification of the email content, wherein the sub-filter fields of the smart filter are selected based on a result of application of trained machine learning processing that executes processing operations comprising:
    categorizing the email results into one or more categorical entity classifications based on an analysis of a type of content associated with the retrieved email results,
    selecting a category, from the one or more categorical entity classifications, wherein the selecting identifies a subset of the email results specific to the category,
    analyzing metadata for the subset of the email results specific to the category,
    identifying the plurality of entity-specific tags based on a result of analyzing the metadata for the subset of the email results specific to the category,
    selecting the sub-filter fields based on a result of analyzing the plurality of entity-specific tags, and
    generating the smart filter to comprise the sub-filter fields specific to the category; and
transmitting data associated with the smart filter for rendering of the smart filter through the email service.

10. The computer-readable medium of claim 9, wherein the retrieving further comprises applying trained machine learning processing that correlates the search input with an entity type classification, and wherein the categorizing categorizes the email results based on the entity type classification.

11. The computer-readable medium of claim 9, transmitting, for rendering, data associated with a set of basic filters for filtering the email results, wherein the data associated with the set of basic filters is utilized for rendering of the set of basic filters, displayable along with the smart filter, through the email service.

12. The method of claim 1, wherein the selecting of the sub-filter fields comprises generating, by the trained machine learning processing, confidence scoring identifying relevance of the plurality of entity-specific tags, and selecting two or more of the entity-specific tags as the sub-filter fields based on a result of the confidence scoring.

13. The system of claim 5, wherein the selecting of the sub-filter fields comprises generating, by the trained machine learning processing, confidence scoring identifying relevance of the plurality of entity-specific tags, and selecting two or more of the entity-specific tags as the sub-filter fields based on a result of the confidence scoring.

14. The computer-readable medium of claim 9, wherein the selecting of the sub-filter fields comprises generating, by the trained machine learning processing, confidence scoring identifying relevance of the plurality of entity-specific tags, and selecting two or more of the entity-specific tags as the sub-filter fields based on a result of the confidence scoring.

15. The method of claim 12, wherein the transmitting of the data associated with the smart filter comprises data for rendering graphical user interface elements for user selection of one or more of the sub-filter fields.

16. The system of claim 13, wherein the transmitting of the data associated with the smart filter comprises data for rendering graphical user interface elements for user selection of one or more of the sub-filter fields.

17. The computer-readable medium of claim 14, wherein the transmitting of the data associated with the smart filter comprises data for rendering graphical user interface elements for user selection of one or more of the sub-filter fields.

18. The method of claim 1, wherein the transmitting transmits the data for rendering the smart filter based on a receipt of an indication that a user of the mailbox selects a specific category for the email results.

19. The system of claim 5, wherein the transmitting transmits the data for rendering the smart filter based on a receipt of an indication that a user of the mailbox selects a specific category for the email results.

20. The computer-readable medium of claim 9, wherein the transmitting transmits the data for rendering the smart filter based on a receipt of an indication that a user of the mailbox selects a specific category for the email results.

* * * * *